(12) United States Patent
Ryder et al.

(10) Patent No.: US 8,011,440 B2
(45) Date of Patent: Sep. 6, 2011

(54) PRECISION HOE OPENER ASSEMBLY WITH ADJUSTABLE PACKER WHEEL LOCATION

(75) Inventors: Nicholas George Alfred Ryder, Saskatoon (CA); Montgomerie Summach, Saskatoon (CA); Gordon Anthony Engel, Saskatoon (CA); Gerard James Gadzella, Saskatoon (CA); Barry Pomedli, Saskatoon (CA); Jim Henry, Saskatoon (CA)

(73) Assignee: CNH Canada, Ltd. (CA)

( * ) Notice: Subject to any disclaimer, the term of this patent is extended or adjusted under 35 U.S.C. 154(b) by 49 days.

(21) Appl. No.: 12/141,904

(22) Filed: Jun. 18, 2008

(65) Prior Publication Data

US 2008/0308022 A1 Dec. 18, 2008

Related U.S. Application Data

(60) Provisional application No. 60/944,790, filed on Jun. 18, 2007.

(51) Int. Cl.
 *A01B 61/04* (2006.01)
 *A01B 63/00* (2006.01)
 *A01B 63/111* (2006.01)
 *A01H 5/02* (2006.01)

(52) U.S. Cl. .............. 172/239; 172/260.5; 172/663; 172/675

(58) Field of Classification Search .......... 172/407, 172/395, 239, 413, 4, 260.5, 417, 448, 423, 172/424, 427, 663, 675; 111/926, 62, 134, 111/135
See application file for complete search history.

(56) References Cited

U.S. PATENT DOCUMENTS

| | | | |
|---|---|---|---|
| 1,931,783 A | 10/1933 | Wickes | |
| 2,627,797 A | 2/1953 | Acton | |
| 2,839,851 A | 12/1954 | Geiszler | |
| 2,818,269 A | 12/1957 | Northcote et al. | |
| 3,599,728 A | 8/1971 | Moe et al. | |
| 4,326,594 A | 4/1982 | Oka et al. | |
| 4,398,478 A * | 8/1983 | Frase et al. | 111/196 |
| 4,580,507 A | 4/1986 | Dreyer et al. | |
| 4,694,759 A | 9/1987 | Dreyer et al. | |
| 4,721,048 A | 1/1988 | Fuss et al. | |
| 4,759,301 A | 7/1988 | Thomas | |
| 5,031,550 A | 7/1991 | Neal | |

(Continued)

FOREIGN PATENT DOCUMENTS

AU 58706/86 12/1986

(Continued)

OTHER PUBLICATIONS

U.S. Appl. No. 12/141,881, filed Jun. 18, 2008; Applicants: Jim Henry et al.; Entitled: "Precision Hoe Opener and Packer Wheel Assembly".

(Continued)

*Primary Examiner* — Christopher J. Novosad
(74) *Attorney, Agent, or Firm* — Rebecca Henkel; Sue Watson

(57) ABSTRACT

A precision hoe opener assembly is provided with improved accuracy of seeding as well as improved control over the opener and packer wheel assemblies. The opener assembly features a hydraulically-driven parallel linkage assembly, a ground engaging tool, and an adjustable packer wheel assembly. The design provides improved seeding accuracy by providing a variable distance between the ground engaging tool and the packer wheel. Specifically, embodiments of the present invention allow for adjustment of the distance between the ground engaging tool and wheel elements.

9 Claims, 10 Drawing Sheets

U.S. PATENT DOCUMENTS

| | | | |
|---|---|---|---|
| 5,161,472 | A | 11/1992 | Handy |
| 5,234,060 | A | 8/1993 | Carter |
| 5,351,635 | A | 10/1994 | Hulicsko |
| 5,396,851 | A | 3/1995 | Beaujot |
| 5,855,245 | A | 1/1999 | Gerein |
| 6,032,593 | A | 3/2000 | Wendling et al. |
| 6,142,085 | A | 11/2000 | Drever et al. |
| 6,986,313 | B2 | 1/2006 | Halford et al. |
| 7,104,205 | B2 | 9/2006 | Beaujot |
| 7,152,539 | B2 | 12/2006 | Swanson |
| 7,159,523 | B2 | 1/2007 | Bourgault et al. |
| 7,168,376 | B2 | 1/2007 | Johnston |
| 7,261,048 | B1 | 8/2007 | Hantke |
| 2007/0245938 | A1 | 10/2007 | Bourgault et al. |
| 2008/0029002 | A1 | 2/2008 | Sulman |
| 2008/0308024 | A1 | 12/2008 | Lung et al. |

FOREIGN PATENT DOCUMENTS

| | | |
|---|---|---|
| FR | 2630286 | 10/1989 |

OTHER PUBLICATIONS

U.S. Appl. No. 12/141,891, filed Jun. 18, 2008; Applicants: Nicholas George Alfred Ryder et al.; Entitled: "Precision Hoe Opener with Swing Link Between Cylinder and Shank".

U.S. Appl. No. 12/141,895, filed Jun. 18, 2008; Applicants: Nicholas George Alfred Ryder et al.; Entitled: "Precision Hoe Opener Assembly with Swing Link and Biasing Member".

U.S. Appl. No. 12/141,908; filed Jun. 18, 2008; Applicants: Nicholas George Alfred Ryder et al.; Entitled: "Precision Hoe Opener with Draft Force Compensation".

Voichinskii, S.M.; Agricultural Implement depth controller; Derwent Abstract Accession No. B4505B/07, SU 599755 A (Minsk Tractor Wks) Apr. 19, 1978; abstract drawings.

\* cited by examiner

PRECISION HOE OPENER ASSEMBLY WITH ADJUSTABLE PACKER WHEEL LOCATION

RELATED APPLICATION

This application benefits from the priority of U.S. Provisional Patent Application No. 60/944,790, entitled "Precision Hoe Opener Assembly with Swing Link and Biasing Member," filed Jun. 18, 2007, which is hereby incorporated by reference in its entirety.

BACKGROUND

The invention relates to agricultural seeders, such as hoe openers and seeding tools used in farming operations to distribute seeds into a soil.

Generally, precision hoe openers are mounted to the frame of an implement which is towed behind a tractor. These openers may include a ground engaging tool that opens the soil, providing a path for seed deposition into the soil. After the send is deposited, the ground engaging tool may be followed by a packer wheel that packs the soil on top of the deposited seed. The packer wheel may be rigidly mounted behind the ground engaging tool via a structural member or rear frame. Thus, the ground engaging tool and packer wheel generally move together with the same upward and downward motion. This vertical motion, somewhat independent of the implement frame, allows for more precise placement of seed in the soil.

Unfortunately, existing precision hoe openers do not adequately address the need for height variation over terrain during seeding, or for transportation when not seeding. It is generally undesirable to pull the hoe opener through soil when merely transporting the opener from one location to another. In addition, during seeding, existing precision hoe openers do not provide adequate vertical motion of the opener and related assembly without compromising the load on the ground engaging tool and packer wheel. As a result, variations in the terrain can result in drastic changes in the packing force (e.g., normal force) of the packer wheel on the terrain being seeded by the opener assembly and, also, the draft force of the terrain on the ground engaging tool. In turn, this variation in ground opening force and packing force can result in non-uniform seeding depths and packing density in the terrain being seeded.

The distance between the packer wheel and ground engaging tool can also affect the seeding accuracy of the opener assembly. Existing precision hoe openers have a fixed distance between the packer wheel and ground engaging tool. A greater distance between the components will cause variations in the terrain to greater affect on the accuracy of the product placement. As the position of the ground engaging tool is determined by the packer wheel the greater the distance from the packer wheel the less accurate the seed placement. This will also result in non-uniform force applied to the soil by the two components, which reduces seeding accuracy.

For instance, some existing opener assemblies may employ a parallel linkage to control the height of the packer wheel and ground engaging tool. One of the difficulties in using a parallel linkage is that the force at the packer wheel will fluctuate as the draft force is applied to the ground engaging tool as the opener assembly moves vertically relative the carrier frame as the packer wheel follows the contour of the terrain. However, if the packer wheel is too close to the ground engaging tool there may be insufficient time for the soil displaced by the ground engaging tool to flow back over top of the seed prior to the packer wheel packing the soil down. Therefore there exists an optimal distance between the packer wheel and the ground engaging assembly that is small enough to provide accurate contour following by the opener assembly and large enough to allow for the soil to flow back over the seed prior to being packed by the packer wheel. It would be desirable to be able to adjust the position of the packer wheel relative to the ground engaging tool to optimize this distance for a given field condition.

Existing precision hoe openers also require substantial force to raise the opener assembly, including the ground engaging assembly and packer wheel. This requirement results in the use of large hydraulic cylinders to raise the apparatus, due to the overall length and weight of each opener assembly. This hydraulic equipment is costly and takes resources (i.e. hydraulic power) from other portions of the tractor and seeding implement.

There is a need, therefore, for improved arrangements in precision hoe openers that improve the accuracy of the seeding operation. There is a particular need for a precision hoe opener configuration that allows adjustments in the distance between the ground engaging tool and the packing wheel to improve seeding accuracy.

BRIEF DESCRIPTION

Embodiments of the present invention address the problem of inadequate vertical motion of the tool by optimizing the geometric relationship of the cylinder, parallel linkage, ground engaging tool, and packer wheel. Specifically, embodiments of the present invention allow for adjustment of the distance between the ground engaging tool and packer wheel elements.

Embodiments of the present invention may include an adjustable packer wheel to enable an operator to optimize the position of the packer wheel with respect to the ground engaging tool. This enables the operator to adjust the position of the packer wheel depending on soil types, opener type, ground speed, and so forth. In other words, the adjustable packer wheel provides the operator with the ability to configure the tool for specific seeding needs and to enhance seeding accuracy.

Various refinements exist of the features noted above in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to subject matter set forth in claims.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
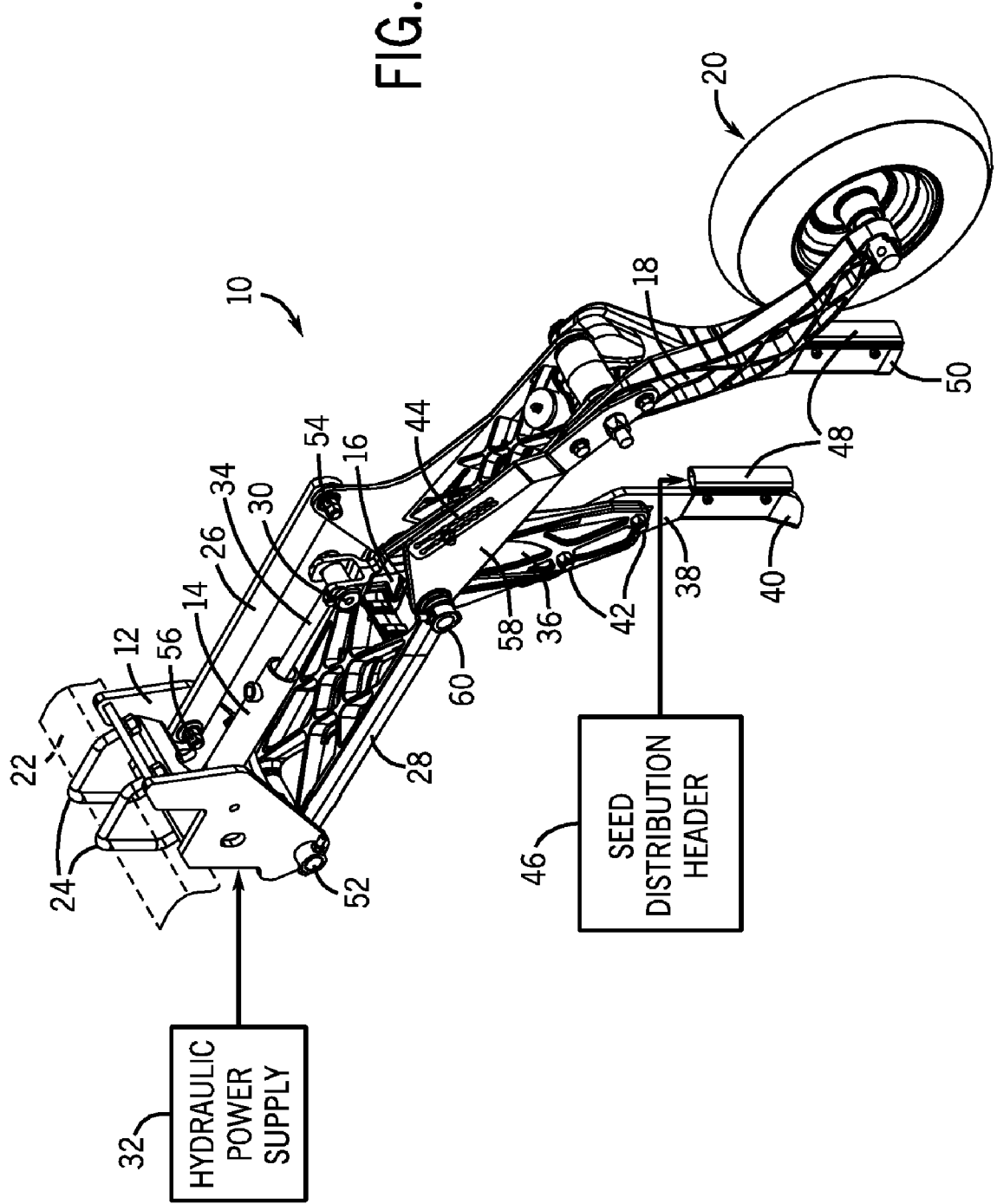
FIG. 1 is a perspective view of an embodiment of a precision hoe opener having a frame support, a cylinder, a swing link assembly, a rear frame assembly, a ground engaging tool, and a packer wheel.

Turning now to the drawings and referring first to FIG. 1, an embodiment of a precision hoe opener assembly is illustrated and designated generally by reference numeral 10. Precision opener assembly 10 includes a frame support 12, a linear actuator such as a cylinder 14 (e.g., a hydraulic, piston-driven assembly), a swing link assembly 16, a packer wheel assembly 18 (e.g., packer arm), and a packer wheel 20. Precision hoe opener assembly 10 may be towed, pushed, or generally moved by a vehicle, such as a tractor (not pictured). For example, the frame support 12 may be connected to tool frame tow bar 22 attached to the tractor for towing the precision hoe opener assembly 10. The precision hoe opener assembly 10 is mounted to the tractor support via mounting brackets 24. In the present context, the precision hoe opener assembly 10 may also be referred to as an opener assembly, a hoe opener, a row unit, a seeder, a planter, an opener or a ground engaging tool/assembly.

Tool frame support 12 is connected to the swing assembly 16 of packer wheel assembly 18 via the cylinder 14, first member 26, and second member 28. The mounting configuration of cylinder 14, first member 26, and second member 28 will be discussed further below. Cylinder 14 is mounted to swing link assembly 16 via pin 30. Cylinder 14 is hydraulically coupled to a power supply 32 that may be used to pressurize piston rod 34 to actuate the swing link assembly 16. Once actuated, swing link assembly 16 engages packer wheel assembly 18 via a stop as will be described further below. The swing link assembly 16 may engage the packer wheel assembly 18 via a shank mount adapter 36. The shank mount adapter 36 is coupled to a shank 38 and a first ground engaging tool 40. Shank mount adapter 36 may be coupled to shank 38 via fasteners 42, which allow height adjustments for ground engaging tool 40. Packer wheel assembly position adjustments may be made via adjustment mechanism 44. First ground engaging tool 40 is coupled to a seed distribution header 46 via a seeding tube 48 to allow product deposition during operation. The present embodiment illustrates an optional second ground engaging tool 50, which may be added in some cases to allow for a second product to be placed in the ground. The adjustments enabled by fasteners 42, adjustment mechanism 44 and the corresponding slot may optimize product placement accuracy by allowing packer wheel 20 to move with respect to first ground engaging tool 40 and second opener 50. Moreover, the optional second ground engaging tool may affect the packing forces and/or compensation of the system, but likely not significantly alter the basic design of the precision hoe opener assembly and swing link mechanism.

In the embodiment, adjustment mechanism 44 includes several holes on packer wheel assembly 18. Selected holes on the packer wheel assembly 18 may be aligned with holes on rear frame 58 to adjust the position of packer wheel 20 relative to first ground engaging tool 40. As depicted, pins or bolts may be inserted in the aligned holes to secure the position of the packer wheel 20.

The diagram also shows first member 26 attached via pins 54 and 56 to tool frame support 12, rear frame 58, and packer wheel assembly 18. Second member 28 is also connected to rear frame 58 and tool frame support 12 via pins 60 and 52. Further, pins 60 and 54 couple rear frame 58 to the shank mount adapter 36 as well as second member 28. The elements 12, 26, 28, and 58 may be collectively described as a four-bar linkage or parallel linkage assembly. As depicted, cylinder 14 drives the parallel linkage assembly.

In general, the figures illustrate that the precision opener assembly 10 has an increased range of motion providing a generally constant packing force to the soil. This is achieved by the opener assembly 10 maintaining a substantially constant angle between packer wheel assembly 18 and terrain in combination with the geometry of cylinder 14, first member 26, and second member 28.

As discussed above, cylinder 14 actuates swing link assembly 16 to load shank 38, which further loads packer wheel assembly 18 and packer wheel 20 through rear frame 58. In certain embodiments, the packer wheel 20 provides a substantially constant force to the soil after the seed has been deposited. As is commonly known in the art, packer wheel 20 is coupled to packer wheel assembly 18 via a rotating bearing. Further, packer wheel assembly 18 includes multiple mounting holes on adjuster 44 to allow for positional adjustment of the packer wheel 20. As stated above, seeding accuracy may be enhanced by adjusting the position of packer wheel 20.

Figure 2:
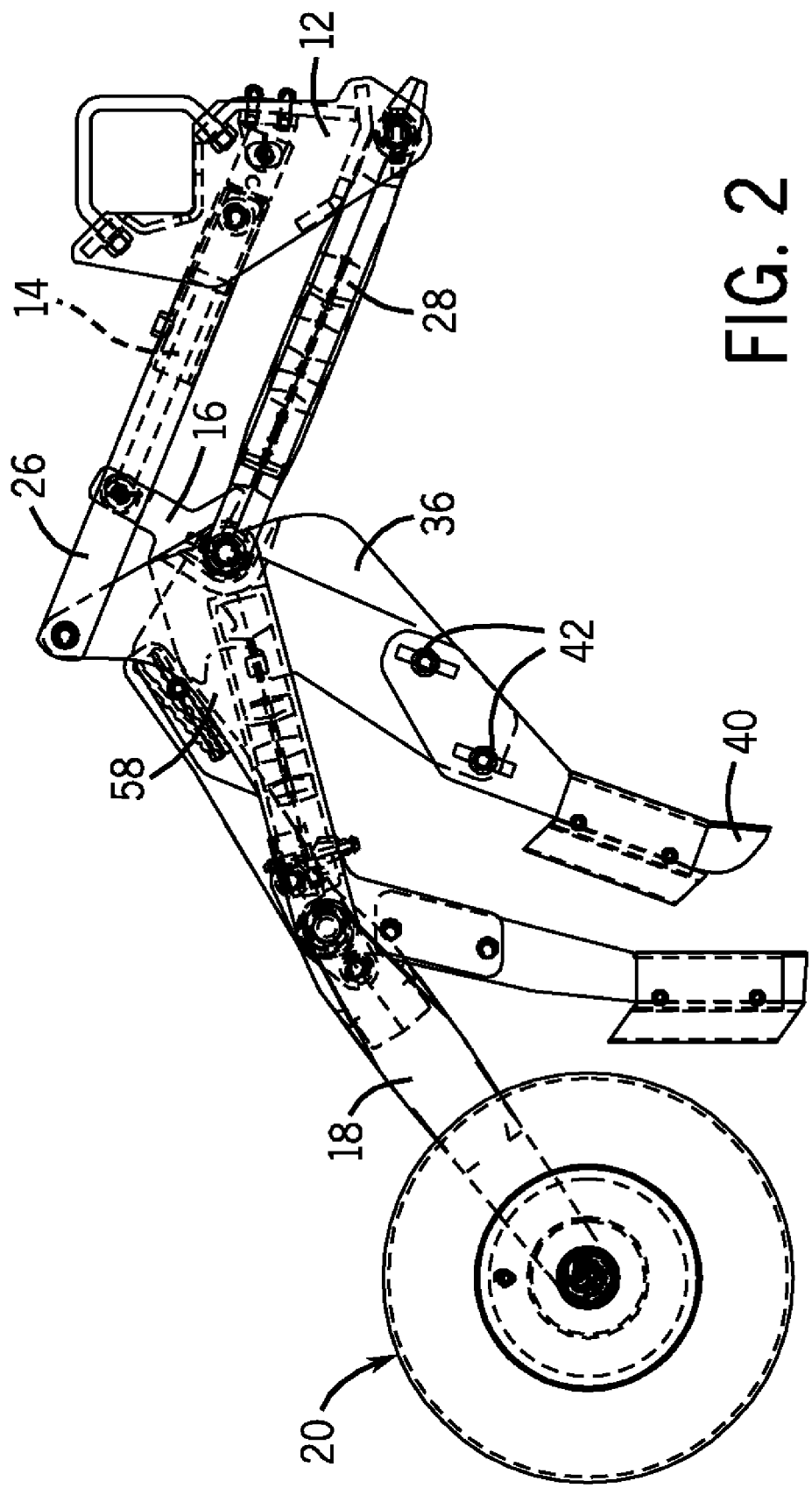
FIG. 2 is a side view of an embodiment of the precision hoe opener of FIG. 1.

FIG. 2 illustrates a side view of an embodiment of the precision hoe opener 10. The figure illustrates the precision hoe opener 10 in the deployed position with the swing link assembly 16 and first ground engaging tool 40 in an elevated position as compared to packer wheel 20. In the illustrated embodiment, cylinder 14 is retracted (shown with hidden lines) causing swing link assembly 16 to rotate about pin 60 and engage shank mount adapter 36, while an obstacle may cause first ground engaging tool 40 to be raised above the plane of packer wheel 20 and second ground engaging tool 50.

Figure 3:
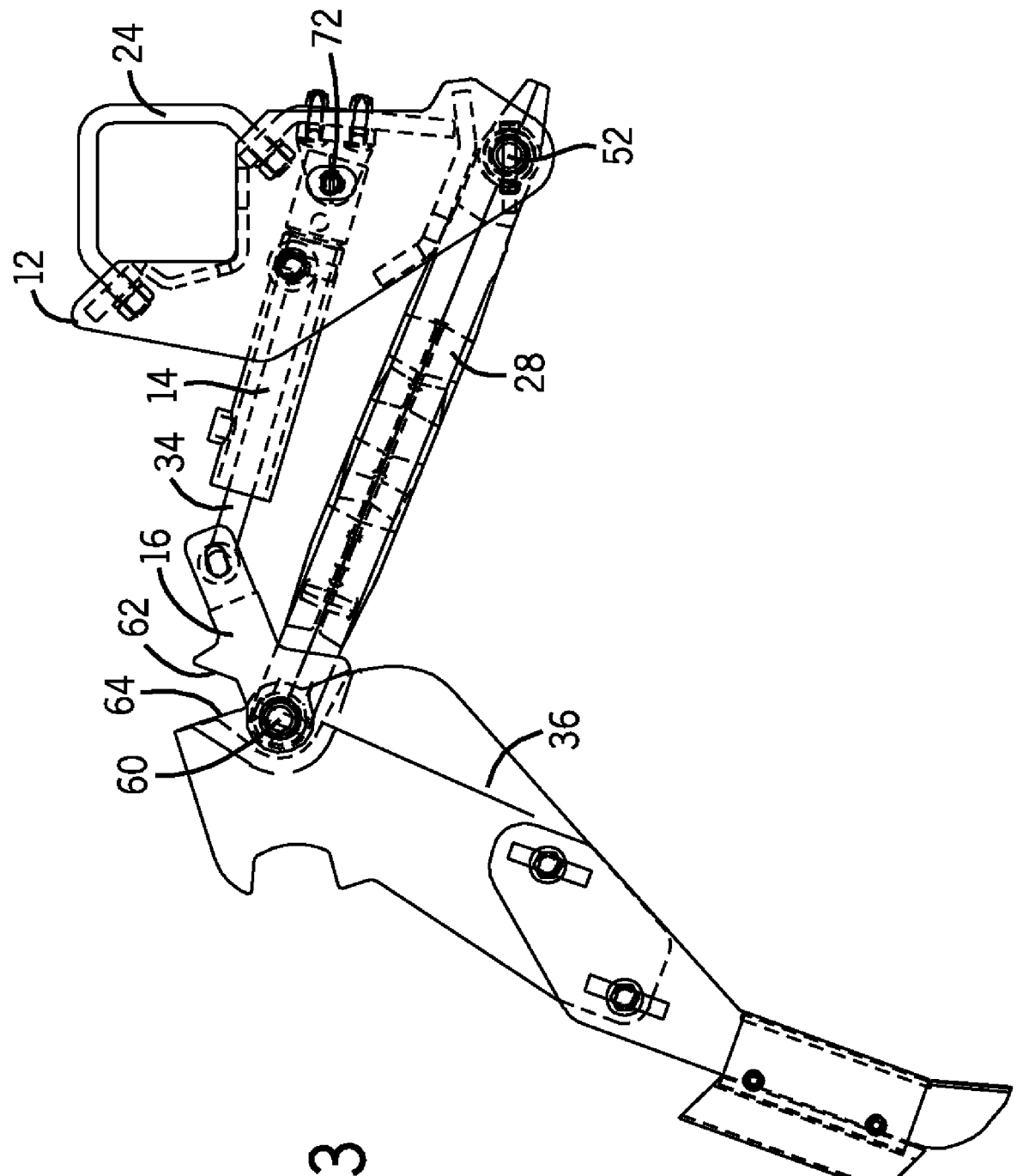
FIG. 3 is a sectional view of an embodiment of the opener assembly of FIGS. 1 and 2, wherein the packer wheel, the rear frame assembly, and certain elements have been removed for clarity.

FIG. 3 illustrates a portion of the precision hoe opener 10 with certain features removed for clarity, such as packer wheel 20, packer wheel assembly 18, and first member 26. The figure illustrates the tool frame support 12, cylinder 14, second member 28, swing link assembly 16, and shank mount adapter 36. Further, FIG. 4 is a perspective view of the shank mount adapter 36, swing link assembly 16, and their related elements.

Figure 4:
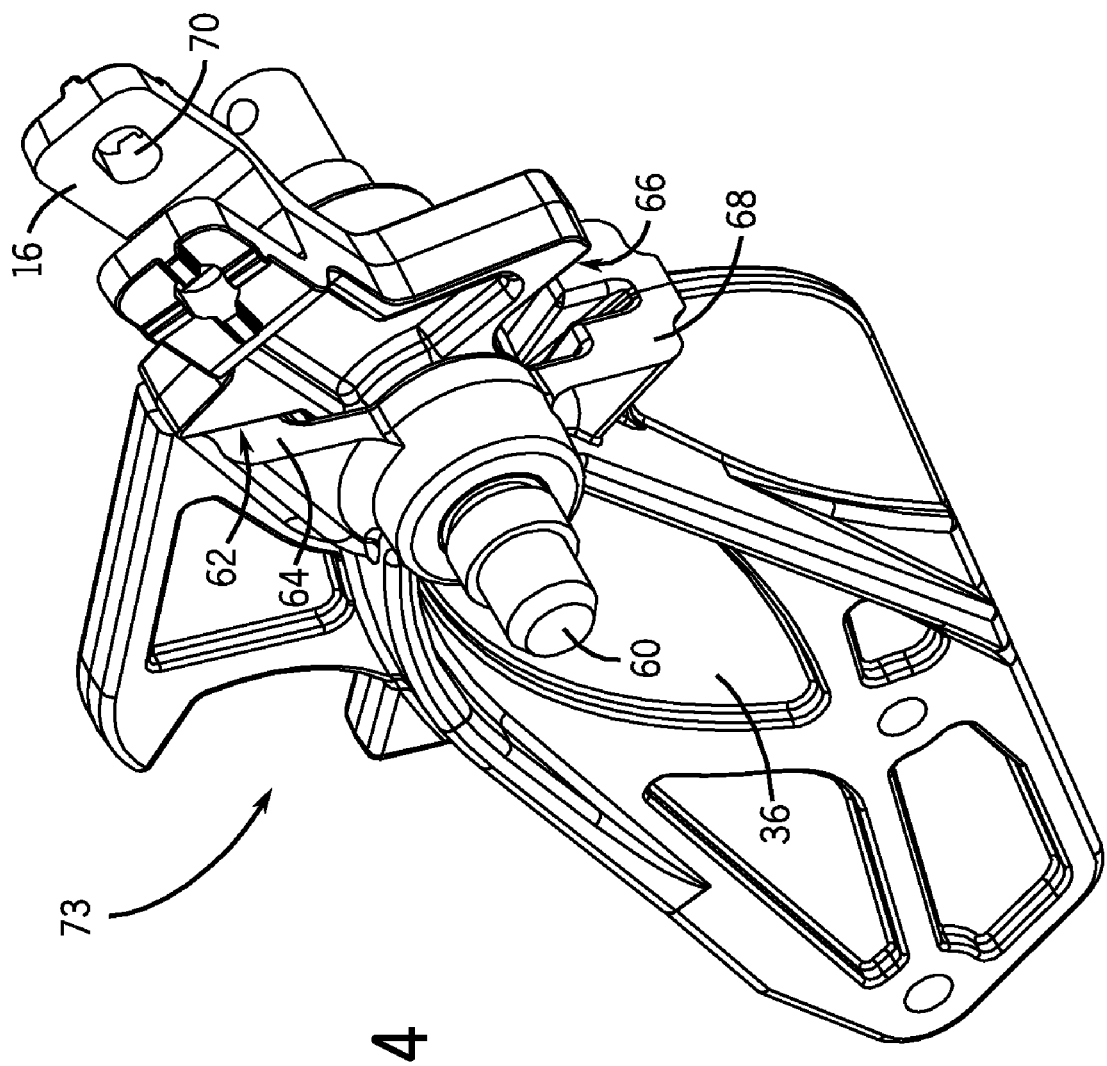
FIG. 4 is a perspective view of an embodiment of the shank mount adapter, the swing link assembly, and associated features shown in FIG. 3.

Referring to both FIGS. 3 and 4, shank mount adapter 36 includes a main body having a number of features. These features interface the swing link assembly 16 to the shank mount adapter 36 during either retraction or extension of the cylinder 14. The swing link assembly includes extension mating feature 62 that interfaces with extension contact surface 64 as well as retraction feature 66 and surface 68. These features provide greater leverage about pin 60 for cylinder 14, reducing the amount of hydraulic power needed to move the opener assembly. Hole 70 provides a mounting location for the end of piston rod 34 in the swing link assembly. Pin 72 is provided for the opposite end of the cylinder 14 to mount to tool frame support 12. As will be appreciated by one skilled in the art, a portion of the angular movement of the swing link assembly 16 will not cause movement of the shank mount adapter 36. This characteristic may cause the swing link assembly 16 to be referred to a lost motion linkage.

FIG. 4 shows the swing link assembly 16 in the extension position to engage the shank mount adapter 36 extending the first ground engaging tool 40 and packer wheel assembly 18 generally downward. In this position, extension mating feature 62 engages extension contact surface 64. In the present embodiment, the geometry of swing link assembly 16 reduces the required length for members 26 and 28 necessary to raise and lower ground engaging tool assembly 10. The swing link assembly 16 may be described as contacting the surfaces of shank mount adapter 36 at the extremities of the angular rotational movement of the swing link assembly 16 in order to raise or lower the shank. When in the extension position, as shown in FIG. 4, frame stop cavity 73 rotates as well, engaging a frame stop, located on the rear frame, to provide lowering force upon the packer wheel assembly. It follows, that when the swing link assembly 16 is in a retraction position, as shown in FIG. 2, the frame stop may provide a lifting force to the packer wheel assembly.

Referring back to FIG. 3, the swing link assembly 16 is shown in the retracted position in which the first ground engaging tool 40 is higher than the packer wheel 20. In the illustrated position of FIG. 3, retraction mating feature 66 engages retraction contact surface 68. As shown in both FIGS. 3 and 4, the cylinder 14 and piston rod 34 are not directly coupled to shank mount adapter 36. Instead, the first ground engaging tool 40 is retracted and extended via the swing link assembly 16 engaging and disengaging the shank mount adapter 36.

Figure 5:
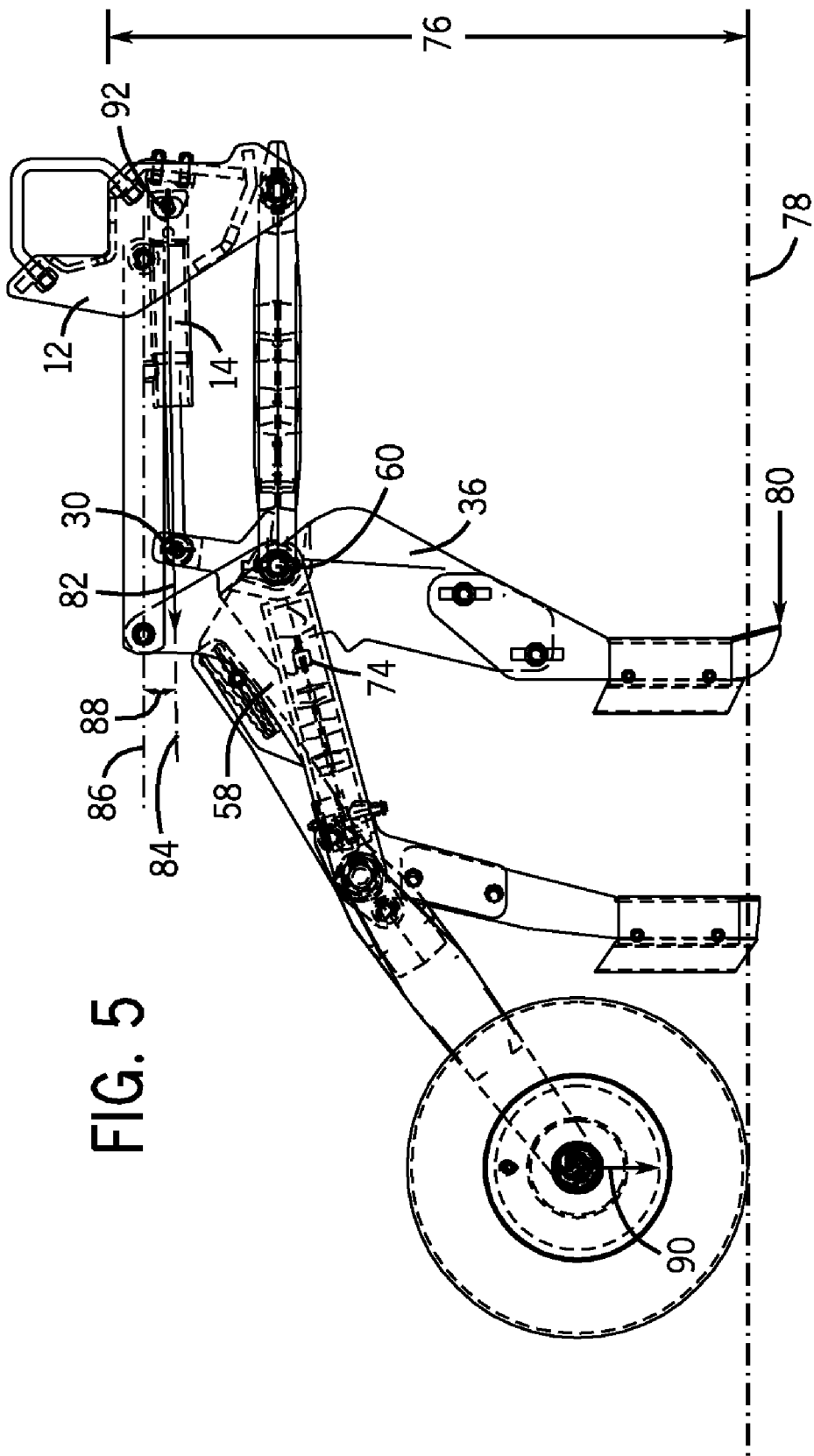
FIG. 5 is a side elevational view of an embodiment of the precision hoe opener as illustrated in FIG. 1, further illustrating a neutral or horizontal operating position to illustrate draft compensation loading provided by the cylinder to the packer wheel when the assembly is in this operating position.

FIG. 5 illustrates an embodiment of the precision hoe opener 10 in a neutral position as might be representative of being towed during a seeding operation on level ground. In this deployed position for the seeder, shank mount adapter 36 rotates about pin 60 to lower first ground engaging tool 40 and engage frame stop 74 located on rear frame 58. When shank mount adapter 36 rotates about pin 60 and engages the top surface of frame stop 74, shank mount adapter 36 loads packer wheel assembly 18 which is coupled to rear frame 58. The resulting force applies a load to packer wheel 20 via the multiple linkage assembly.

Further, tool frame support 12 is a nominal distance 76 from terrain 78. During normal operation, first ground engaging tool 40 may plow through terrain 78 creating a draft force 80 on first ground engaging tool 40. In this position, cylinder load 82 is directed along cylinder axis 84. Linkage axis 86 runs through the center of parallel linkage member 28. Numeral 88 represents the small angle between cylinder axis 84 and linkage axis 86. The normal load on packer wheel 20, generally represented by numeral 90, may mainly consist of the weight of opener 10 with a nominal contribution by cylinder load 82. Hydraulic cylinder 14 serves primarily to keep first ground engaging tool 40 in a deployed position and is connected to the assembly by pins 72 and 30.

Figure 6:
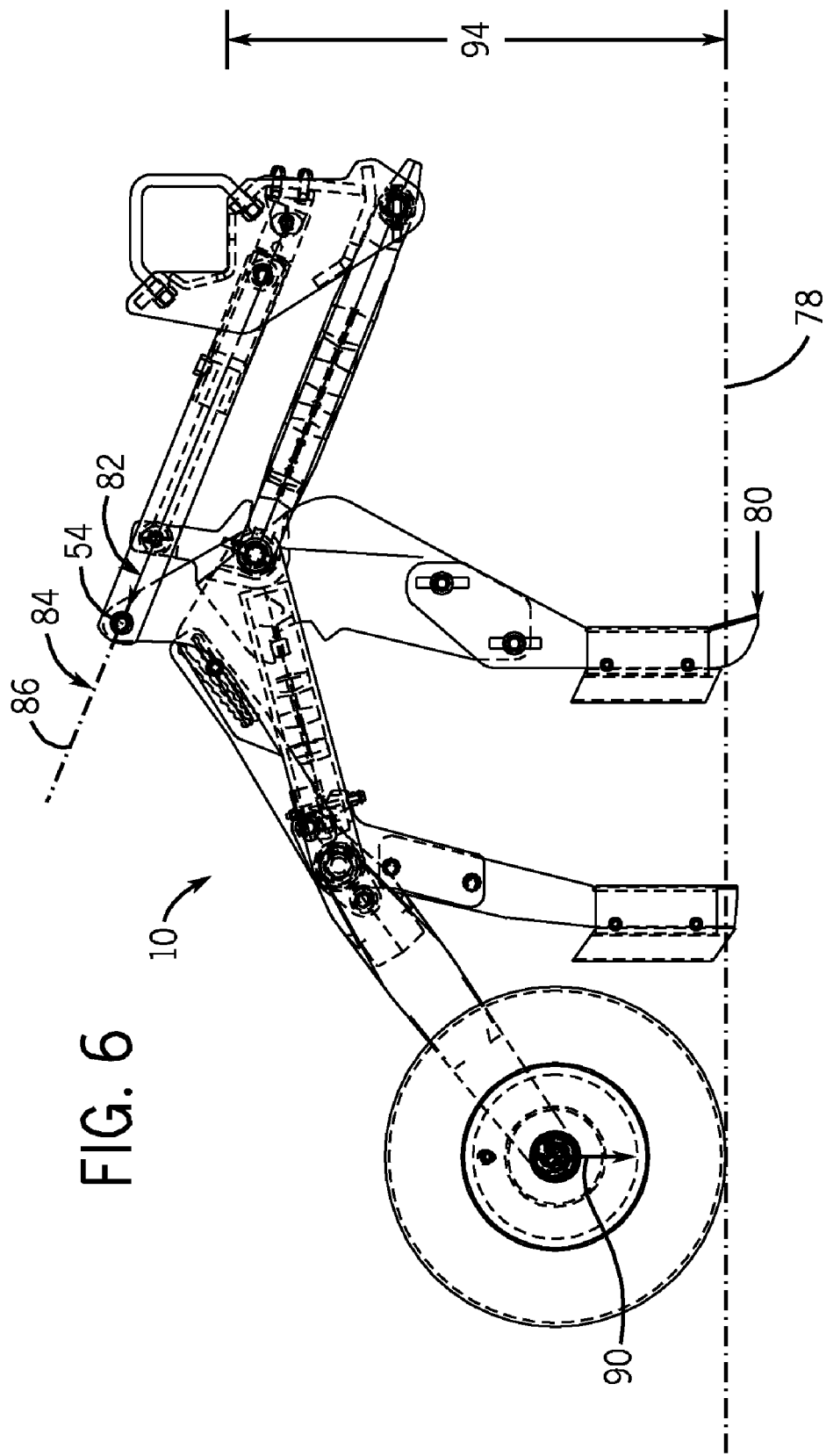
FIG. 6 is a side elevational view of an embodiment of the precision hoe opener as illustrated in FIG. 1, further illustrating a second operating position with the draft compensation when the assembly is in this operating position.

FIG. 6 illustrates an embodiment of the precision hoe opener 10 in a second deployed position. In this position, the relative distance between tool frame support 12 and terrain 78 has decreased from that of FIG. 5 and is represented by numeral 94. This decrease in the distance typically occurs during terrain changes. The terrain provides a draft force 80 on first ground engaging tool 40, thereby increasing the packing force 90 of the packer wheel 20 on the terrain 78 due to the orientation of the links 26 and 28 relative to the direction of the application of the draft force. In the illustrated embodiment, cylinder 14 may provide a lifting force to counteract the increased packing force 90 on the packer wheel 20 due to a decrease in angle 88. Cylinder load 82 produces a resultant force in the opposite direction of packing force 90, thereby compensating for a portion of the downward force created by the draft force 80 on first ground engaging tool 40.

Figure 7:
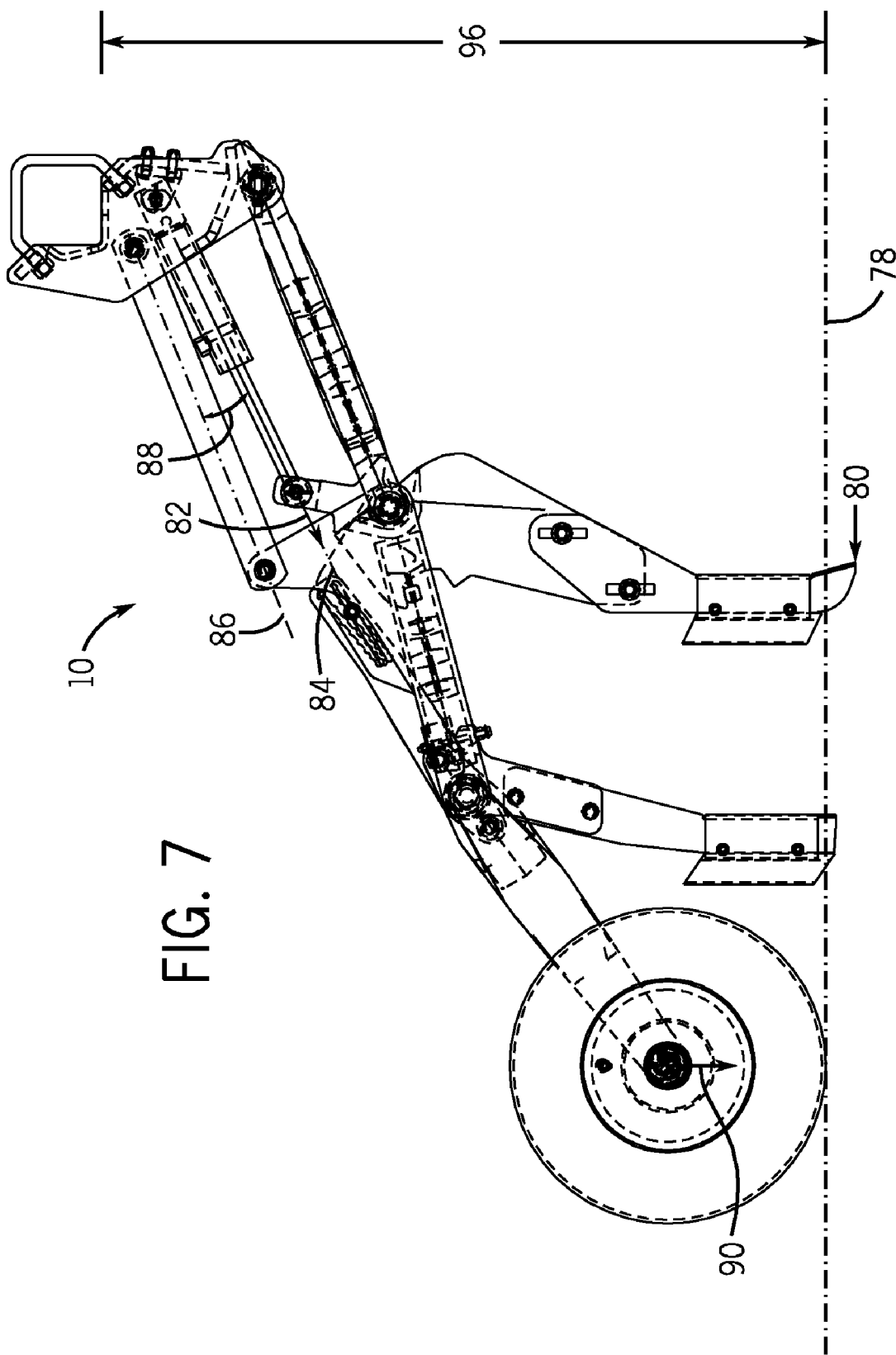
FIG. 7 is a side elevational view of an embodiment of the precision hoe opener as illustrated in FIG. 1, further illustrating a third operating position to illustrate the draft compensation loading provided by the cylinder to the packer wheel when the assembly is in this operating position.

FIG. 7 illustrates an embodiment of the precision hoe opener 10 in a third deployed position. In this illustration, relative distance 96 between tool frame support 12 and terrain 78 has increased relative to FIGS. 5 and 6. As discussed above, this increase may be dependent on the terrain in the field. In this illustration, the relative increase in the distance between tow bar 22 and terrain 78 causes draft force 80 to reduce the packer force 90 on the packer wheel 20 due to the orientation of links 26 and 28 relative to the direction of the draft force 80. The upward resultant force on the opener assembly 10 thereby decreases the packing force 90 placed on terrain 78. Optimally, it is desirable to maintain a constant packing force by the packer wheel 20 on the terrain 78 to ensure accurate seeding. As illustrated by the figure, when the relative distance increases, the piston load 82 may act along cylinder axis 84 and the relative angle 88 increases which in turn increases the contribution of the piston load to the packing force 90, on the packer wheel 20. In other words, the cylinder 14 compensates for the decrease in packing force created by draft force 80. Further, the angle between cylinder axis 84 and linkage axis 86, represented by numeral 88, is larger than in FIG. 5, causing a substantial downward component to cylinder force 82 to act upon packer wheel 20.

In general, FIGS. 5, 6, and 7 illustrate that the precision opener assembly 10 has an increased range of motion while providing a generally constant packing force to the soil. This is achieved in part by the opener assembly 10 maintaining a substantially constant angle between packer wheel assembly 18 and terrain 78, as well as the geometry of cylinder 14, first member 26, and second member 28.

As appreciated by one in the art, the disclosed embodiments of precision opener 10 provide control of the packing force 90 and the seeding depth of the first ground engaging tool 40. The opener assembly 10 advantageously responds to variations in the terrain 78, the draft force 80 on the first ground engaging tool 40, the packing force 90, or a combination thereof. Thus, the opener 10 can provide a generally uniform packing force 90 and seeding depth to improve the overall quality of the seeding process, and in turn improve subsequent growth originating from the seeds. Again, the hoe opener 10 has a variety of adjustment mechanisms to control the location of the packer wheel 20, the first ground engaging tool 40, the optional second ground engaging tool 50, or a combination thereof.

Figure 8:
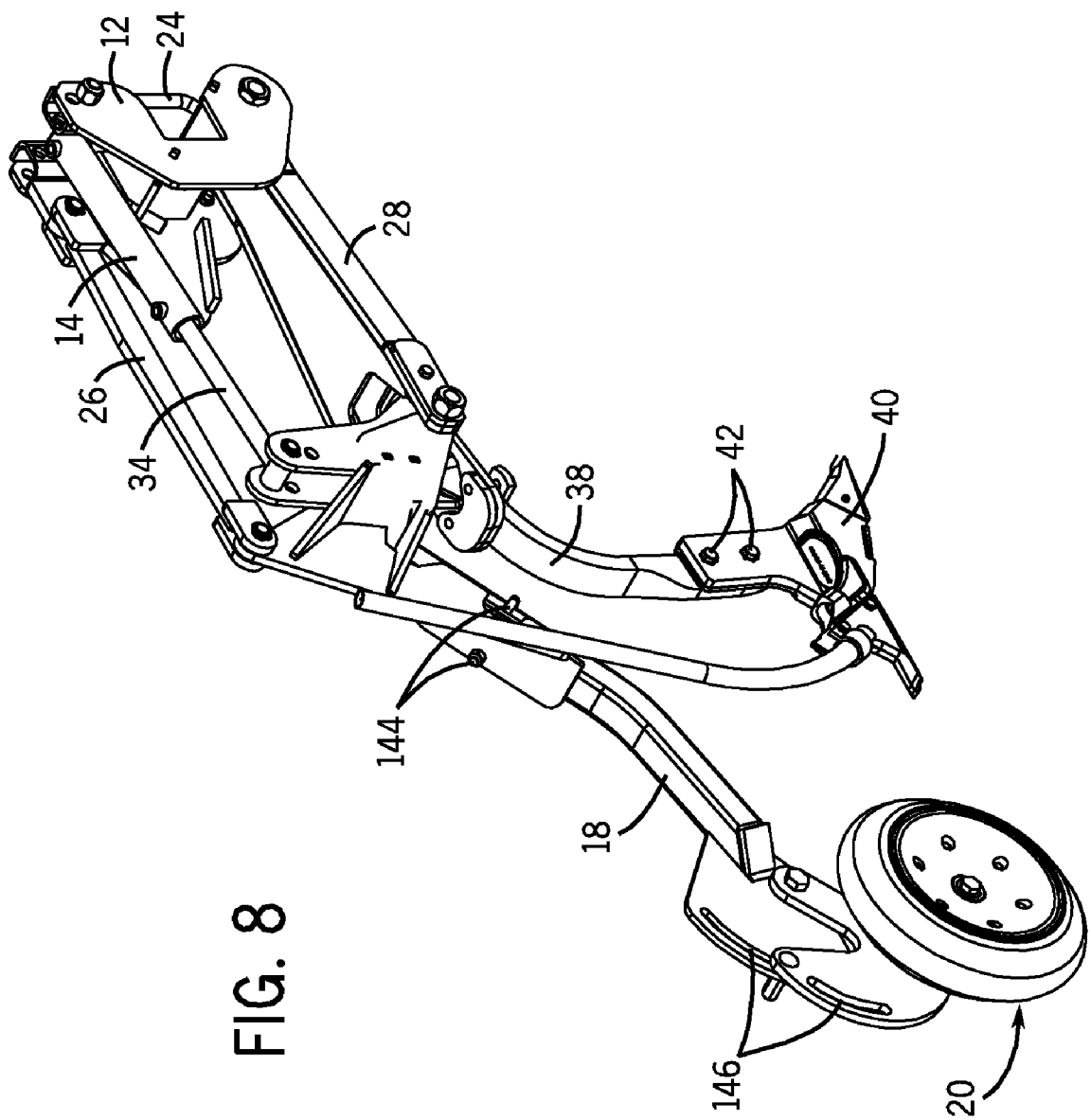
FIG. 8 is an alternate embodiment of the disclosed precision opener assembly, including the parallel linkage and the packer wheel height adjuster.

Another embodiment of opener assembly 10 is shown in FIG. 8. The illustrated embodiment includes ground engaging tool 40, shank 38, and packer wheel 20. In the embodiment, adjustment mechanism 144 is shown in the form of u-bolt brackets, which, when loosened, allow the extension and retraction movement of an arm member of the wheel assembly 18, causing a movement of packer wheel 20 relative to the ground engaging tool 40, thereby changing the horizontal distance between the packer wheel 20 and the ground engaging assembly 40 without significantly effecting the relative vertical position between packer wheel 20 and ground engaging assembly 40. Further adjustment mechanism 146 allows for the vertical position of the packer wheel 20 to be changed relative to ground engaging assembly 40 without significant effect to the relative horizontal position between the two. As depicted, adjustments 144 and 146 enable an operator to set the relative vertical and horizontal positions of tool 40 and packer wheel 20 to many different combinations, giving the operator greater flexibility when configuring the seeder for a particular application. In the present embodiment, adjustments 144 and 146 allow for many combinations of vertical and horizontal positions. As depicted, packer wheel assembly 18 may feature one or more fasteners, such as a bolt and nut, and holes or slots located between the wheel arm and the wheel itself. In the embodiment, the slot and bolt mechanism allows angular and height adjustment of the wheel in addition to the adjustment provided by the u-bolt bracket. As shown in the diagram, the fastener may be positioned in a slot to enable further adjustments of the position of packer wheel 20.

Figure 9:
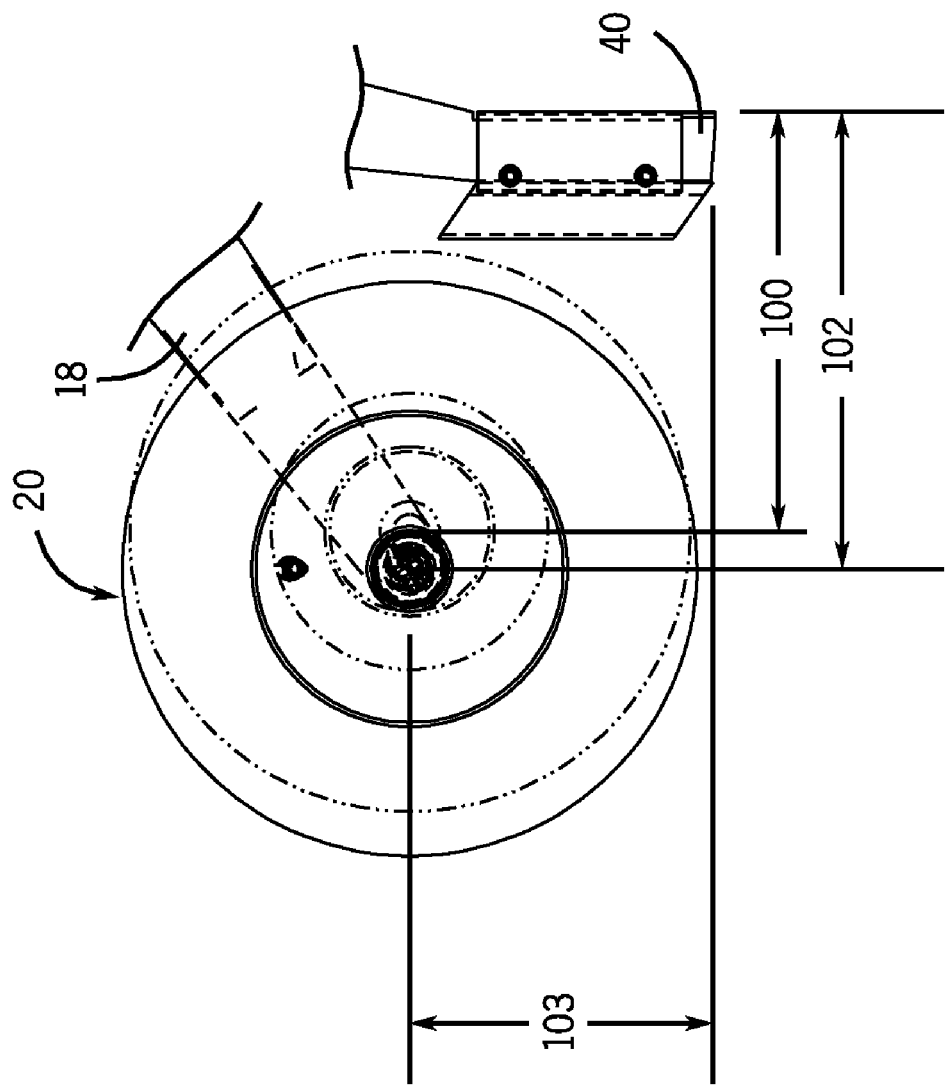
FIG. 9 is a sectional view of an embodiment of the opener assembly of FIG. 1 including the opener and packer wheel assembly in two different positions, wherein the parallel linkage, and certain elements have been removed for clarity.

FIG. 9 illustrates the variable position of packer wheel 20, relative to first ground engaging tool 40. To enhance clarity, several components of opener assembly 10 have been removed. As depicted, the embodiment shows a stationary ground engaging tool 40 as the position of packer wheel 20 is adjusted by any of the previously discussed adjustment mechanisms. For example, the embodiment of FIG. 8 may have adjustment mechanism 144 extend the arm of packer wheel assembly 18, causing a increase in horizontal distance from distance 100 to distance 102. Further, vertical distance 103 may remain substantially constant or may be adjusted as well by mechanism 146. As will be appreciated by one skilled in the art, the configuration and mechanisms used to adjust the horizontal and vertical distance of packer wheel 20 relative to ground engaging tool 40 may be of any suitable type, including holes, slots, pins or bolts.

As will be appreciated by one skilled in the art, the wheel assembly adjustments discussed above may be accomplished by several techniques which enable the user to adjust the implement and its packer wheel to optimize seed accuracy and distribution. This arrangement enables the operator to adjust the position of the packer wheel depending on soil types, opener type, ground speed, and other conditions. In other words, the adjustable packer wheel arrangement provides the operator with the ability to configure the tool for specific seeding needs and to optimize the seeding process depending on a variety of factors.

Figure 10:
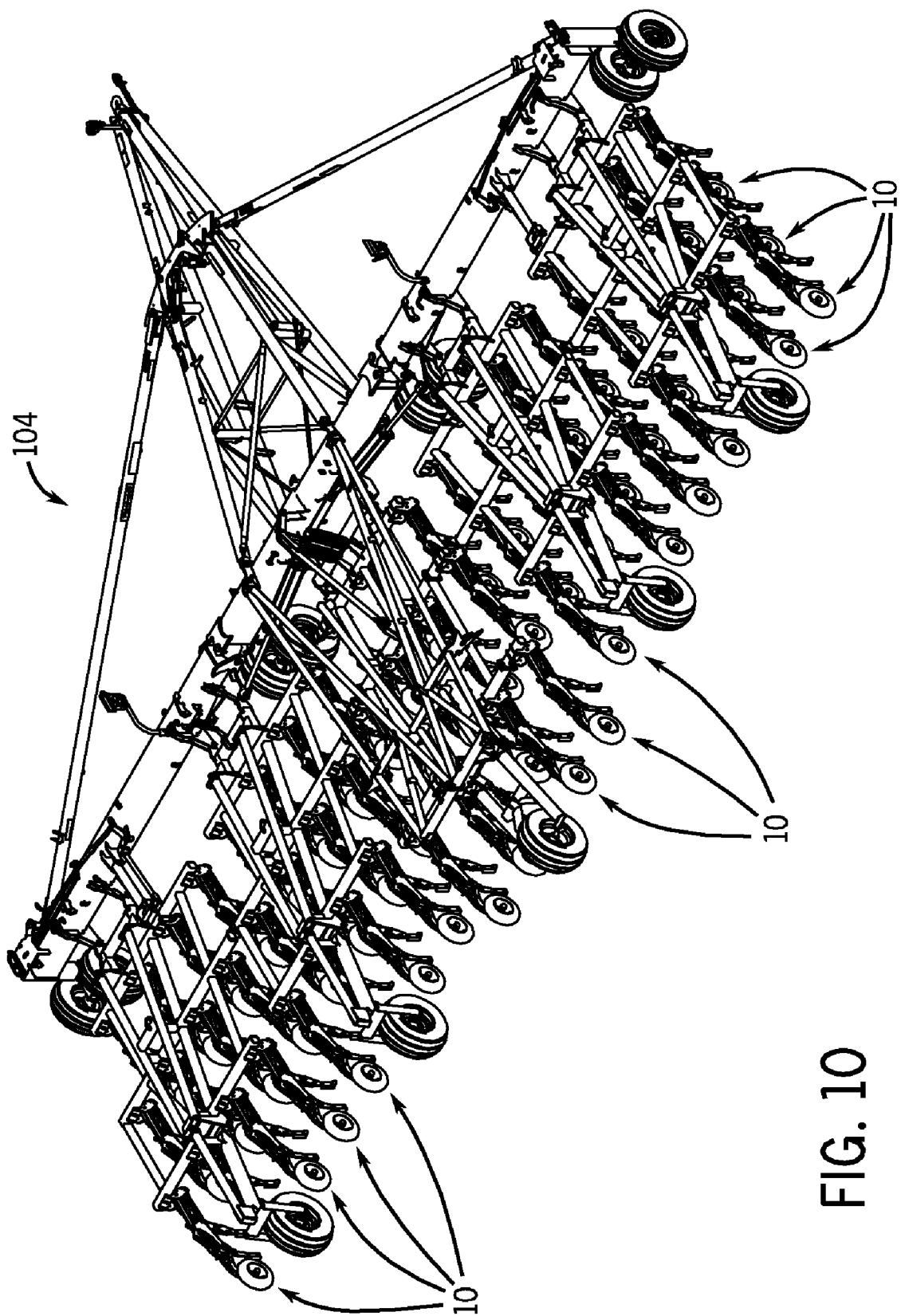
FIG. 10 is a perspective view of an entire seeder assembly system, including multiple opener assemblies and the tool bars that they are attached thereto.

FIG. 10 illustrates the implement assembly, including precision opener assemblies 10, as row units of a complete agricultural seeder system 104, as may be towed behind a tractor (not shown). As shown in the diagram, the seeder system 104 includes a plurality of opener assembly row units mounted on several tool frame bars which are generally transverse to the direction the seeder system is pulled. As the seeder system 104 is towed across a field with the row units deployed, a plurality of rows of crops may be seeded in each pass.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system comprising:
   a support structure including a parallel linkage assembly, a portion of the parallel linkage assembly including a longitudinal axis therethrough;
   an actuator carried adjacent to the support structure, the actuator having a longitudinal axis therethrough, an angle formed between an intersection of the axes;
   a ground engaging assembly extending from the support structure; and
   a packer wheel assembly including a packer wheel extending from the support structure aft of the ground engaging assembly, such that the parallel linkage assembly and the actuator move in conjunction with alterations of terrain and the parallel linkage assembly and the actuator cooperate to apply force to the packer wheel and the packer wheel assembly when the angle between the axes increases, and to remove force from the packer wheel and the packer wheel assembly when the angle between the axes decreases, to control a packing force and a seeding depth of the ground engaging assembly relative to such alterations of terrain, the packer wheel assembly comprising, a first adjustment mechanism and a second adjustment mechanism, the first adjustment mechanism is configured to provide a first range of motion of the packer wheel with respect to the ground engaging assembly, and the second adjustment mechanism is configured to provide a second range of motion, different from the first range of motion, of the packer wheel with respect to the ground engaging assembly.

2. The system of claim 1, wherein the first adjustment mechanism is configured to extend or retract an arm to adjust a distance between the packer wheel and the ground engaging assembly; and the second adjustment mechanism is configured to adjust an elevation of the packer wheel with respect to an end of the arm.

3. The system of claim 2, wherein the packer wheel is coupled to the end of the arm.

4. The system of claim 2, wherein the packer wheel is positionable continuously along a range of positions.

5. The system of claim 1, wherein the support structure includes a shank adapter, and the ground engaging assembly is rigidly mounted to the shank adapter.

6. The system of claim 5, wherein the packer wheel assembly is raised when it contacts the shank adapter.

7. The system of claim 1, wherein the parallel linkage cooperates with the actuator for raising and lowering the ground engaging assembly.

8. The system of claim 7, wherein the packer wheel assembly extends from the support structure, and wherein the parallel linkage assembly and the actuator cooperate with the packer wheel assembly to maintain a substantially constant orientation of the packer wheel with respect to alterations of terrain.

9. The system of claim 1, comprising a plurality of opener row units, each including the support structure, the actuator, the ground engaging assembly, and the packer wheel assembly.

* * * * *